United States Patent [19]

Hiesinger et al.

[11] Patent Number: 5,785,286
[45] Date of Patent: Jul. 28, 1998

[54] APPARATUS FOR THE RELEASABLE CONNECTION OF A PHOTOGRAPHIC OR OPTICAL INSTRUMENT TO A TRIPOD OR THE LIKE

[76] Inventors: Reinhard Hiesinger, Memminger Str. 41, 87724 Ottobeuren; Klaus Bothe, Munchner Strasse 1, 82057 Icking, both of Germany

[21] Appl. No.: 505,394

[22] Filed: Jul. 21, 1995

[30] Foreign Application Priority Data

Jul. 23, 1994 [DE] Germany .......... 94 11 987 U

[51] Int. Cl.⁶ .................................................. F16M 11/04
[52] U.S. Cl. ........................ 248/187.1; 403/325; 403/326
[58] Field of Search ............. 248/187.1, 221.11, 248/222.51, 177.1; 396/419, 428; 292/207; 403/325, 321, 326, 327

[56] References Cited

U.S. PATENT DOCUMENTS

| 534,912 | 2/1895 | Perry Jr. ........................ 248/187.1 |
| 1,119,412 | 12/1914 | Donegan et al. ................ 403/325 X |
| 3,006,052 | 10/1961 | Sticknet et al. ............... 248/177.1 X |
| 3,184,196 | 5/1965 | Dent ............................. 248/187.1 |
| 3,356,325 | 12/1967 | Schnase . |
| 3,549,113 | 12/1970 | Paglluso . |
| 3,612,462 | 10/1971 | Mooney et al. . |
| 4,057,816 | 11/1977 | Killian, Jr. et al. ............ 248/187.1 X |
| 4,570,887 | 2/1986 | Banister ....................... 248/187 |
| 4,899,189 | 2/1990 | Frost ........................... 354/293 |
| 4,929,973 | 5/1990 | Nakatani ...................... 248/187.1 X |
| 5,222,826 | 6/1993 | Hanke .......................... 396/419 X |
| 5,333,023 | 7/1994 | Oxford ......................... 248/222.13 X |
| 5,429,332 | 7/1995 | Ishikawa ....................... 248/187.1 |

FOREIGN PATENT DOCUMENTS

| 90 16 714.7 | 4/1991 | Germany . |
| 94 11 987 | 7/1994 | Germany . |

OTHER PUBLICATIONS

Patent Abstracts of Japan, vol. 6, No. 255 (p. 162) (1133) 14, Dec. 1982 & JP 57 150 838 (Canon) Sep. 17,1982.

Primary Examiner—Ramon O. Ramirez
Assistant Examiner—Stephen S. Wentsler
Attorney, Agent, or Firm—Jacobson, Price, Holman & Stern, PLLC

[57] ABSTRACT

There is described an apparatus for the releasable connection of a photographic or optical instrument to a tripod or the like. The apparatus comprises a housing (3) having a recess (2) arranged to receive the head of a screw connected to the instrument. The screw head is held within the housing by a pivotal lever (9) which is urged into a locking position by a spring (11).

1 Claim, 3 Drawing Sheets

APPARATUS FOR THE RELEASABLE CONNECTION OF A PHOTOGRAPHIC OR OPTICAL INSTRUMENT TO A TRIPOD OR THE LIKE

BACKGROUND OF THE INVENTION

1. Technical Field

The invention relates to apparatus for the releasable connection of a photographic or optical instrument to a tripod or the like using a screw with a screw head which is screwed into the instrument or the tripod.

2. Description of the Prior Art

Photographic and optical instruments, i.e. telescopes, cameras and the like, are often mounted on tripods. The tripods known to this end generally have a screw with a knurled head which is supported in a bore in the tripod and is screwed into a threaded opening on the photographic or optical instrument to secure the instrument to the tripod. Earlier tripod models have a threaded screw with a ⅜ English thread, while more recent models have a ¼ English thread. The bores on the instruments correspond to the diameter of the threaded screws, allowing for exchange as desired.

As it is time-consuming to screw and unscrew the instruments, adapters are used to secure the instrument to the tripod. One part of the adapter is connected to the tripod and the other part to the instrument. These adapters generally consist of approximately rectangular plates which can be connected together.

In order to achieve rapid connection of the instruments, each instrument has to be provided with a corresponding adapter plate. However, this increases the external dimensions of the instrument so that it may no longer fit into the carrying case provided for it.

Another disadvantage is that the two adapter parts can only be fitted together if they are exactly parallel with one another. The adapter parts are situated below the instruments and are therefore not easily seen and difficult to connect together. Rapid exchange is therefore not always achieved.

SUMMARY OF THE INVENTION

An object of the invention is to provide an improved apparatus for the releasable connection of a photographic or optical instrument to a tripod or the like in such a manner that the exchange can be carried out in a rapid and simple manner and such that the external dimensions of the instrument are not increased.

To achieve this object, the invention departs from apparatus of the type specified hereinabove and proposes that the screw head engages in a recess in a housing and a locking device holds the screw head in place in the housing, a separating device being provided which can be actuated to release the screw head from the recess.

The screw head remains permanently in the corresponding bore in the instrument, while the rest of the device is mounted on the tripod. This means that the external dimensions of the instrument are not increased and it still fits into the bag or carrying case provided for it.

In a preferred embodiment of the invention, the screw is in the form of a screw with a countersunk head having a conical lower surface. The head of the screw preferably has a circumferential knurled edge.

For rapid connection of the instrument to the tripod, the countersunk screw with the knurled head is then introduced into the recess in the device, thereby initiating the locking process.

In a preferred embodiment of the invention, a pivoted lever is provided, the swivel pin of which is parallel to the screw axis and part of which forms the locking device which grips the screw head in the recess by the action of a spring, the pivoted lever having an actuating end for separating or for completely and/or partially releasing the screw from the housing.

The recess has at least approximately the dimensions of the screw head so that the latter can be countersunk in the housing. After this countersinking operation, the locking device is actuated, as a result of which a movable part adapted to the shape of the head holds it in place in the recess with the aid of a spring.

Two stages are provided for connecting the screw head and the housing, wherein, in the first stage, the head can still move slightly in the recess, while it is rigidly fixed in the second stage. The movable part of the locking device is directly connected to the pivoted lever which projects laterally from the housing and can be actuated from the exterior. The pivoted lever under spring pressure holds the screw head in place, thereby providing for the second stage. If the pivoted lever is moved slightly from the exterior, the first stage is achieved and the screw and thus also the instrument can be adjusted and aligned while still being held in the housing.

The pivoted lever is advantageously held in its retracted position by a latch, the latch having an actuating pin which projects into the recess and cooperates with the head of the screw.

The locking mechanism is therefore actuated by slight pressure when the screw is introduced into the recess and the part with the curvature adapted to the head holds it in the housing. In order to release the connection, a bolt may be actuated which acts on the actuating end of the pivoted lever and releases the latter, and the actuating lever is brought into the separating position.

It has been found to be advantageous for the housing to be provided on its side directed towards the instrument with a coating of rubber or the like, the coating preferably being arranged partially in a depression in the housing.

Such a coating enables the instrument, which is held but not rigidly fixed in the recess in the housing with the aid of the knurled screw head, to be aligned. The rubber coating, like the housing wall, has the recess for the knurled head.

In a preferred embodiment of the invention, the housing is provided on its surface opposite the recess or the coating with one or more threaded bores. The threaded screw of the tripod is screwed into these bores. Several threaded bores with different diameters may be provided to accommodate different screw diameters.

It has been found to be advantageous for one or more pins for connecting the housing to a carrying strap to be provided laterally on the housing. These pins can be arranged on the housing in a simple manner and thus allow for easy carrying of the device alone or together with the tripod. If the device is situated on a camera or the like, it too can be carried by the carrying strap of the device. No further carrying strap is required.

It has also been found to be advantageous for the housing to consist of an upper part and a lower part and for the two parts each to have recesses which together receive the bolt, the lever and the spring. This facilitates assembly and the dimensions of the apparatus remain small so that it can be housed anywhere.

DETAILED DESCRIPTION OF PREFERRED EMBODIMENT

Figure 1:
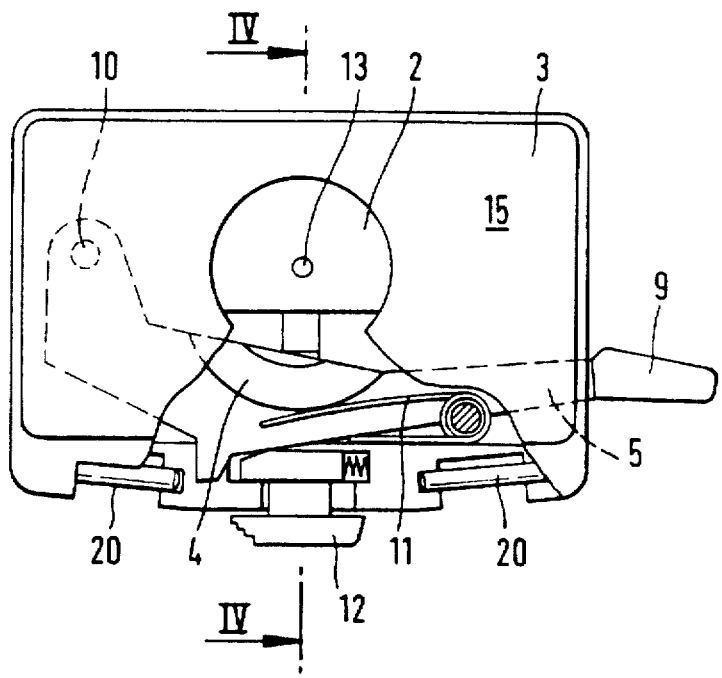
FIG. 1 is a partially sectional top view of an apparatus according to the invention in the release position.

Referring to the Figures, an apparatus according to the invention for the releasable connection of a photographic or optical instrument to a tripod or the like consists essentially of a housing 3 and a knurled wheel 8 mounted on a screw 6. The housing 3 has an opening 2 for receiving the knurled wheel edge 8 of the screw head 1. The opening 2 is substantially circular and is slightly larger than the knurled wheel 8 so that this can be introduced without difficulty.

The rectangular parallelepipedal housing 3 is formed of an upper part 22 and a lower part 21. The lower part 21 has one or more screw bores 18, 19 which when mounted on the underside of the housing 3 receive the threaded screw of the tripod. The several screw bores 18,19 have different diameters to take account of different threads of the threaded screws on different tripods.

A recess 24 is provided on the narrow side 37 of the housing 3 for receiving a pivoted lever 9. The recess 24 is formed by cooperating cut-outs in the upper part 22 and lower part 21.

Figure 2:
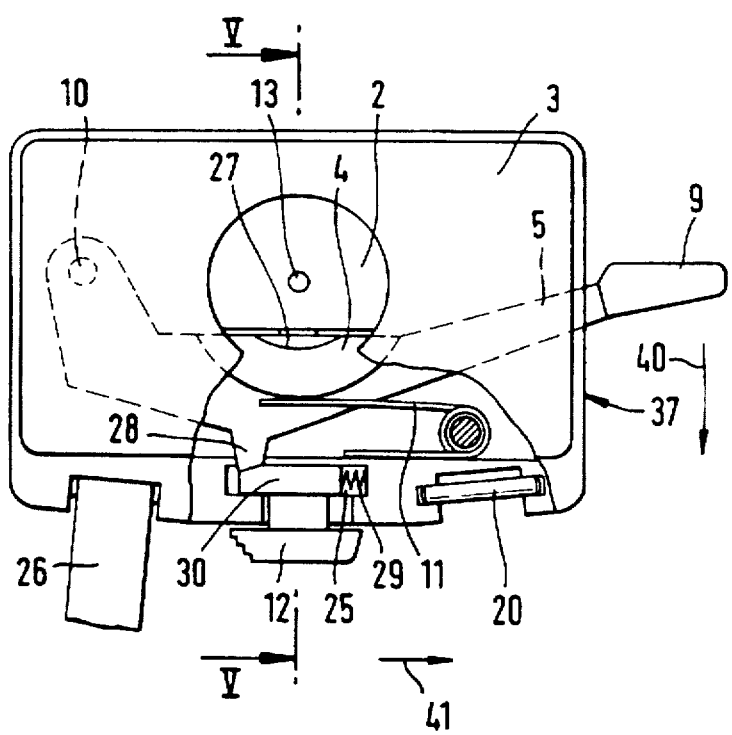
FIG. 2 is a partially sectional top view of an apparatus according to the invention in the locked position.
Figure 6:
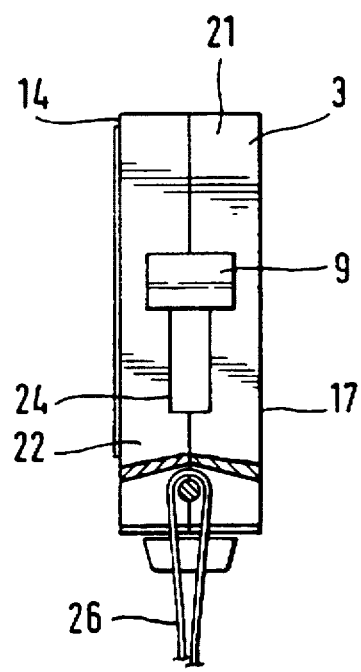
FIG. 6 is a partially sectional side view of an apparatus according to the invention in the locked position.

FIG. 2 and FIG. 6 show the pivoted lever 9 in its locked position. The pivoted lever 9 projects through the recess 24 into the interior of the housing 3. The pivoted lever 9 is supported on a swivel pin 10, the swivel pin 10 being provided on the side of the housing 3 opposite the recess 24. The swivel pin 10 is thus parallel to the screw axis.

FIG. 1 shows how the pivoted lever 9 acts as a locking device 4. A spring 11 is arranged in the vicinity of the lateral recess 24 and has a force component acting perpendicularly to the axis of the swivel pin 10. This spring 11 acts on one arm 38 of the pivoted lever 9. The locking device 4 is thus pressed upwards and grips the screw 6 introduced into the recess 2 from below via a projecting lug 39. The lug 39 has a curvature 27 corresponding to the curvature on the cylindrical part of the knurled wheel 8. The pivoted lever 9 or locking device 4 is thus L-shaped, the upright branch of the L being arranged parallel to the swivel pin 10 and forming the arm 38 at one side and the lug 39 projecting from the L at the other side.

A bolt 12 projects out of a recess 23 at one longitudinal side of the housing 3. The bolt 12 acts on a slide 30 and is held in a closed position by a spring 29. In the closed position, as shown in FIG. 2, the slide 30 acts on the actuating end 28 of the pivoted lever 9. This is part of a separating mechanism 5. In the position shown in FIG. 2, the pivoted lever 9 cannot be pivoted downwards in the direction of the arrow 40 as this movement is prevented by the slide 30. In order to be able to pivot the pivoted lever 9 in the direction of the arrow 40, the bolt 12 first has to be moved to the right (as viewed in FIG. 2) in the direction of the arrow 41, in order to remove the bolt 30 from contact with the actuating end 28. This movement in the direction of the arrow 41 is effected against the force of the spring 29. The spring 29 is thereby pressed into a recess 25. The open position of the device achieved in this manner is shown in FIG. 1 and in FIG. 4.

The knurled wheel 8 is arranged on the head 1 of the screw 6. The screw 6 is in the form of a countersunk head screw and the surface of the head 1 forms a flat surface together with a knurled edge. For easier operation, the knurled wheel 8 has a knurled edge ending in a conical transition piece 7. The conical transition piece 7 becomes a cylindrical part 31 which ends in a flat surface 32. The threaded shank which is screwed into a corresponding optical instrument projects from the flat surface 32.

The lug 39 of the locking device 4 with a curvature 27 has a bevel which is approximately parallel to the surface of the conical transition piece 7. When the locking device 4 holds the screw in place, this inclined surface of the lug 39 cooperates with the conical transition piece 7 to perform a holding operation. The opening 2 is also provided at its edge with an inwardly directed bevel 42. This bevel 42 is approximately parallel to the surface of the conical transition piece 7. In the closed, locked position, this part of the surface is pressed against the bevel 42 by the locking device, providing a reaction to the force of the spring 11.

Figure 4:
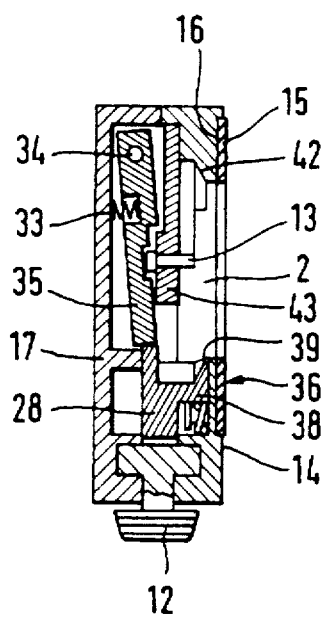
FIG. 4 is a sectional view along the line IV—IV of FIG. 1.

FIG. 4 shows the method of operation of the locking device. A latch 35 can move about an axis 34. In the open position, i.e. in the position in which the device can receive a screw, a spring 33 ensures that the latch 35 bears against a stop 43. This stop 43 is fixed in the housing 3 and the axis 34 is arranged in the housing on the side opposite the bolt 12. On the other side, this stop 43 forms the bearing surface for a screw head inserted through the opening 2. The stop 43 also carries a pin 13 which is movable substantially perpendicularly to this bearing surface and acts on the latch 35. In the position shown in FIG. 4, the latch 35 is pressed against the stop 43 by the spring 33 and thus holds the actuating end 28 in the open position.

Figure 5:
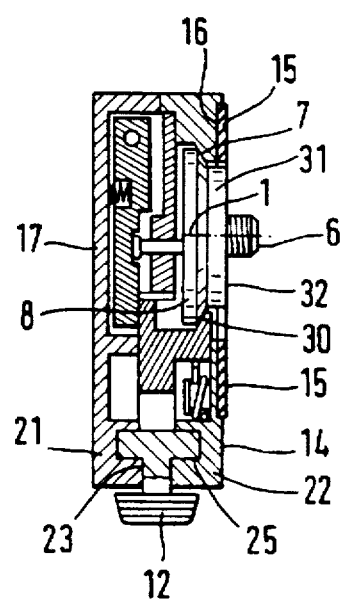
FIG. 5 is a sectional view along the line V—V of FIG. 2, but with a screw and a screw head.
Figure 3:
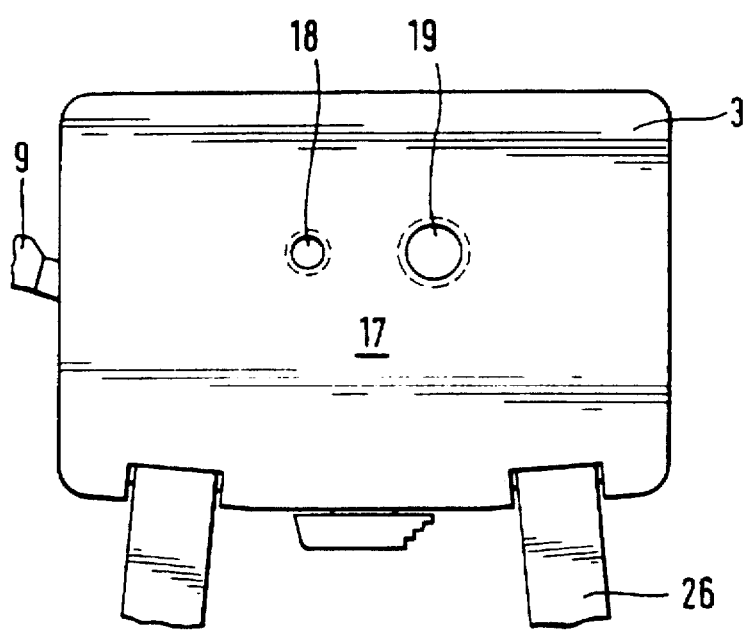
FIG. 3 is a bottom view of an apparatus according to the invention.

When the knurled wheel 8 is pressed firmly into the recess 2, the actuating pin 13 is pressed downwards and in turn presses the movably supported latch 35 away from the actuating end 28. The locking device 4 thus springs into the locked position and grips the screw head 1 or knurl 8 from below (see FIG. 5).

Figure 7:
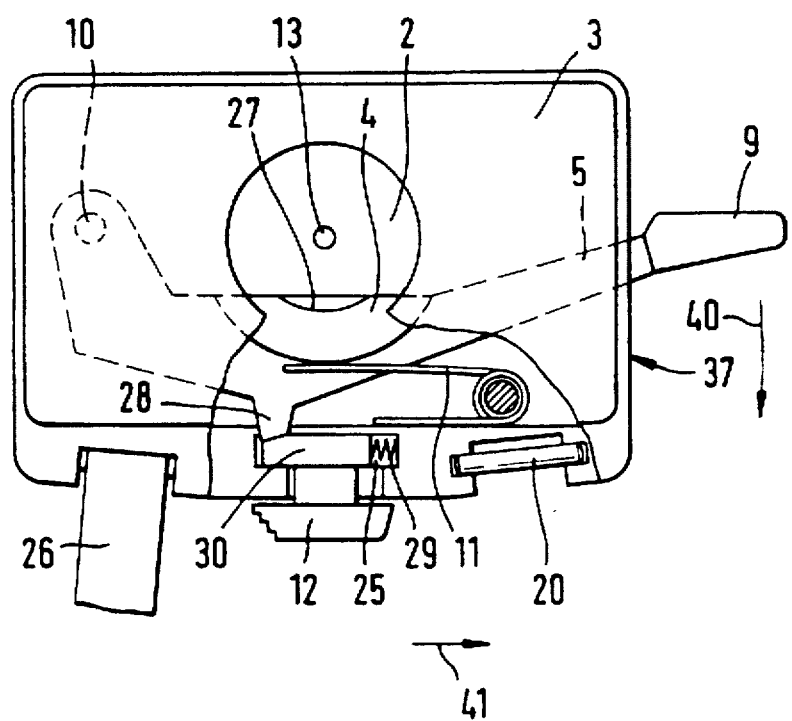
FIG. 7 is a partial sectional top view of an apparatus according to the invention in a locking position.

In this first locked position, the knurled wheel 8 with the screw head 1 can still move in the recess 2 so that the camera can be adjusted. The camera can thus still be rotated, e.g. about the axis of the screw 6 and so can be aligned. By closing the bolt 12 (ie sliding the bolt to the left as viewed in FIG. 2 and as shown in FIG. 7) which then acts on the locking device 4 via the actuating end 28, the camera can be firmly fixed.

A knurled wheel can also be fixed in the housing 3 by, for example, magnetic means, corresponding means then being provided for releasing and locking the device.

In order to prevent a camera or the like from slipping on the surface 14 of the housing 3, a coating 15 is provided in a depression 16 situated opposite the surface 17. The coating 15 is made of rubber or a similar material and is provided in the region of the opening 2 with an opening corresponding to the opening 2. In addition, the coating 15 can be provided on its surface 36 with ribbing.

Two pins 20 are fitted between the lower part 21 and the upper part 22 of the housing 3 on the longitudinal side of the housing 3 having the bolt 12 and receive a carrying strap 26. The pins 20 are spaced from the housing 3 for this purpose.

The housing 3 can be carried against by the user by means of the carrying strap 26, so that, for example, a camera not currently in use can be connected to the carrying strap.

We claim:

1. An apparatus for the releasable connection of a photographic or optical instrument to a tripod, said apparatus comprising

- a screw having a screw head and a threaded shank adapted for connection to the instrument;
- a housing having a recess adapted to receive said screw head;
- separating means actuable to move said screw head from said recess;
- means for securing said housing to said tripod;
- a lever pivotally mounted about an axis parallel to the longitudinal axis of said screw when said screw head is received within said recess and said lever being movable from a retracted position, in which said screw head may be inserted into said recess or removed from said recess with the assistance of said separating means, to a first locking position, in which said screw head is rotatable retained within said recess;
- biasing means urging said lever into said first locking position and away from said retracted position, said biasing means being overcome to locate said screw head in and to remove said screw head from said recess;
- a locking bolt movable from a first position, in which said lever can be moved to said retracted position, to a second position, in which movement of said lever to said retracted position is prevented by said locking bolt, and to a third position in which said locking bolt maintains said lever in a second locking position in which rotation of said screw head within said recess is prevented; and
- a spring to bias said locking bolt from said first position to said second position upon movement of said lever from said retracted position to said first locking position.

* * * * *